United States Patent
Beyhaghi et al.

(10) Patent No.: US 11,624,482 B2
(45) Date of Patent: Apr. 11, 2023

(54) SYSTEM AND METHOD FOR LEAKAGE MITIGATION

(71) Applicant: Rheem Manufacturing Company, Atlanta, GA (US)

(72) Inventors: Saman Beyhaghi, Montgomery, AL (US); Atilhan Manay, Roswell, GA (US); Eric Dong, Lilburn, GA (US); Kyle Jiang, Fayetteville, AR (US); Christopher Mao, Richardson, TX (US); Benjamin Pham, Marietta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 142 days.

(21) Appl. No.: 17/186,417

(22) Filed: Feb. 26, 2021

(65) Prior Publication Data
US 2022/0275913 A1    Sep. 1, 2022

(51) Int. Cl.
*F17D 5/02*    (2006.01)

(52) U.S. Cl.
CPC .................................... *F17D 5/02* (2013.01)

(58) Field of Classification Search
CPC ............... F17D 5/02; Y10T 137/5835; Y10T 137/1767; E03B 7/071; F16K 17/32; F16K 17/40; F16K 31/001; F24H 9/2007; B01F 23/452; B01F 35/7137
USPC ...................................................... 122/14.31
See application file for complete search history.

(56) References Cited

U.S. PATENT DOCUMENTS

| | | | | | |
|---|---|---|---|---|---|
| 3,069,671 | A | * | 12/1962 | Taylor | F24H 9/2007 122/504 |
| 4,193,698 | A | * | 3/1980 | Gartner | B01F 33/5011 206/219 |
| 5,632,302 | A | * | 5/1997 | Lenoir, Jr. | H01H 35/42 307/118 |
| 6,084,520 | A | * | 7/2000 | Salvucci | F24H 9/0005 200/61.04 |
| 6,766,835 | B1 | * | 7/2004 | Fima | G01M 3/2807 219/490 |
| 2014/0079856 | A1 | * | 3/2014 | Hatherell | B67D 1/0406 426/477 |
| 2015/0016208 | A1 | * | 1/2015 | Larson | B65D 25/085 366/130 |

* cited by examiner

*Primary Examiner* — Reinaldo Sanchez-Medina
*Assistant Examiner* — Nicole Gardner
(74) *Attorney, Agent, or Firm* — Eversheds Sutherland (US) LLP

(57) ABSTRACT

A leakage mitigation system includes a leakage detection device having a canister configured to: (i) contain a first reactant and a second reactant and, (ii) based on a volume of liquid leaked from a tank, allow the first reactant and the second reactant to react with each other to produce a gas. A shut-off valve coupled to an inlet pipe of the tank is configured to actuate between an open condition and a closed condition. Further, a conduit extending between the leakage detection device and the shut-off valve allows flow of the gas from the leak detection device to the shut off valve. In order to mitigate the leakage of water, the shut-off valve is actuated between the open condition and the closed condition based on the pressure exerted thereon by the flow of the gas.

20 Claims, 13 Drawing Sheets

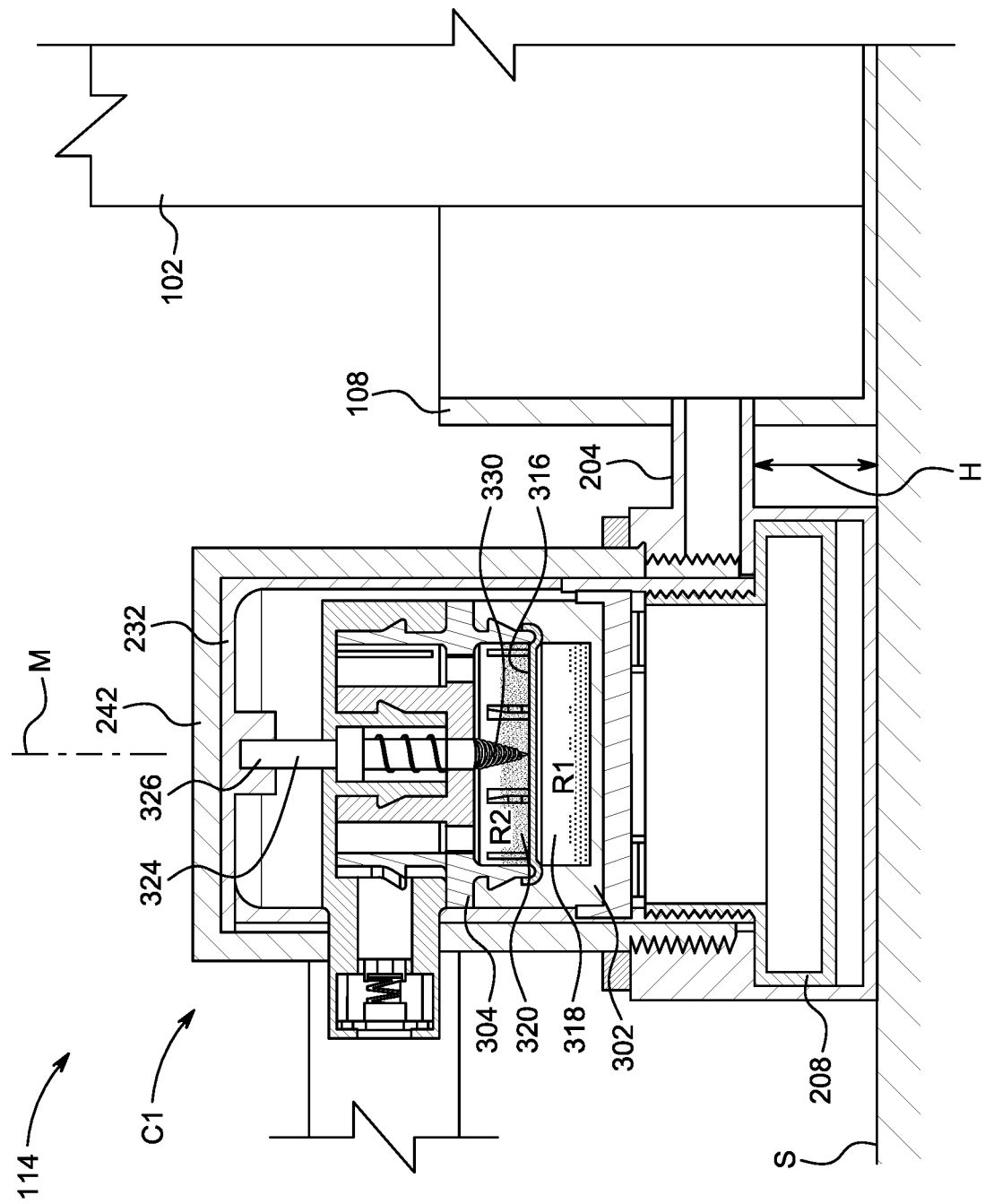

SYSTEM AND METHOD FOR LEAKAGE MITIGATION

TECHNICAL FIELD

The present disclosure relates, in general, to detecting leakage of liquid from a container and, more specifically relates, to a leakage mitigation system to mitigate leakage of water from a water heater.

BACKGROUND

Liquid containers, such as water heaters, may be subjected to deterioration over a period of time. Such deterioration may compromise stability of the water heater and may cause water stored in a storage tank of the water heater to leak. For example, the water may leak from the storage tank and eventually pool at a base of the water heater. When left undetected and unattended, such water leaks may result in damage to furniture, electrical equipment, and the water heater itself, which may result in costly repairs. Further, the water leak could create hazardous working environment for individuals in the vicinity of such leaks. Therefore, it is desirable to detect the presence of such leaks and trigger preventive action to either shut down or isolate a source of water from the leaks to prevent the damage.

Known solutions to detect the leak, and prevent further damage, require supply of electric power and electrical control mechanisms with an electrical actuation and detection system. For example, existing solutions rely on sensors for leak detection and electric power for transmitting signals to a control board and then to an electrically operated shut-off valve coupled to the source of water. Such solutions are expensive and cumbersome to implement with all appliances.

SUMMARY

According to one aspect of the present disclosure, a leakage mitigation system is disclosed. The leakage mitigation system includes a leakage detection device disposed proximate a base of a tank. The leakage detection device includes a canister configured to (i) contain a first reactant and a second reactant and, (ii) based on a volume of liquid leaked from the tank, allow the first reactant and the second reactant to react with each other to produce a gas. In an embodiment, the canister includes a diaphragm disposed therein to separate the first reactant from the second reactant. In an embodiment, the first reactant is a solid reactant, such as sodium bicarbonate, and the second reactant is a liquid reactant, such as acetic acid. The canister further includes a puncture member configured to puncture the diaphragm, thereby allowing the first reactant to react with the second reactant. In some embodiments, the leakage mitigation system further includes a liquid collection chamber configured to receive the liquid leaked from the tank, and a shell threadably coupled to the liquid collection chamber. The leakage mitigation system further includes a platform coaxially disposed between the liquid collection chamber and the shell. The platform is configured to support the canister thereon. The liquid collection chamber and the shell are together configured to move along a longitudinal axis of the leakage detection device with respect to the canister based on a volume of liquid collected in the liquid collection chamber. The movement of the liquid collection chamber and the shell along the longitudinal axis of the leakage detection device causes the puncture member to puncture the diaphragm. In some embodiments, the diaphragm is made of one of a neoprene rubber, ethylene propylene diene monomer rubber, nitrile rubber, acrylonitrile butadiene rubber, or latex rubber.

The leakage mitigation system further includes a shut-off valve coupled to an inlet pipe of the tank and configured to allow flow of liquid through the inlet pipe in an open condition and restrict flow of liquid through the inlet pipe in a closed condition. A conduit of the leakage mitigation system, extending between the leakage detection device and the shut-off valve allows flow of the gas from the leak detection device to the shut off valve. The shut-off valve is configured to actuate between the open condition and the closed condition based on pressure exerted thereon by the flow of the gas. In some embodiments, the canister includes a reactant chamber, a chamber connector fluid-tightly attached to the reactant chamber, and a cap member fluid-tightly attached to the chamber connector and configured to couple with the conduit. Further, the diaphragm is fluid-tightly disposed between the reactant chamber and the chamber connector to define a first chamber configured to contain the first reactant and a second chamber configured to contain the second reactant. In such arrangement, the puncture member extends through to the chamber connector.

The shut-off valve includes an elongated housing defining a first opening configured to: (i) fluidly couple with the conduit, and (ii) receive the gas produced in the canister. The shut-off valve further includes a plunger movably received within the elongated housing and configured to actuate the shut-off valve between the open condition and the closed condition based on pressure exerted thereon by flow of the gas. In an embodiment, the plunger defines a through-hole. The through-hole: (i) remains aligned with the inlet pipe of the tank in the open condition of the shut-off valve, and (ii) remains unaligned with the inlet pipe in the closed condition of the shut-off valve. Further, the plunger includes a cylindrical body having a first end and a second end distal to the first end, where the first end is located proximate the first opening of the elongated housing. The plunger further includes an arm extending from the second end of the cylindrical body and protruding through a second opening defined in the elongated housing. The plunger further includes a biasing member disposed around the arm and configured to resiliently support the plunger within the elongated housing. In an embodiment, the shut-off valve further includes a handle connected to the arm of the plunger, where the handle is provided to reset the shut-off valve to the open condition from the closed condition.

According to another aspect of the present disclosure, a method of mitigating leakage of a tank is disclosed. The method includes disposing a leakage detection device proximate a base of the tank, where the leakage detection device includes a canister with a first reactant and a second reactant capable of producing gas upon reaction with each other. The method further includes receiving, into a liquid collection chamber of the leakage detection device, liquid leaked from the tank. The method further includes allowing movement of the liquid collection chamber along a longitudinal axis of the leakage detection device based on a volume of liquid collected in the liquid collection chamber. The method further includes allowing the first reactant and the second reactant to react with each other, thereby producing a gas. In an embodiment, allowing the first reactant and the second reactant to react with each other is achieved by allowing one or more puncture members to puncture a diaphragm of the canister in response to the movement of the liquid collection chamber. The puncturing of the diaphragm allows the first reactant to react with the second reactant, thereby producing the gas. The method further includes routing the produced gas from the canister to a shut-off valve via a conduit, where the shut-off valve is coupled to an inlet pipe of the tank. In an implementation, the produced gas is routed from the canister to the shut-off valve via the conduit when a pressure of the gas is above a predetermined threshold value. The method also includes actuating the shut-off valve from an open condition to a closed condition based on pressure exerted thereon by the flow of the gas. The shut-off valve is configured to allow flow of liquid through the inlet pipe in the open condition and restrict flow of the liquid through the inlet pipe in the closed condition.

According to yet another aspect of the present disclosure, a water heater is disclosed. The water heater includes a tank, an inlet pipe configured to allow supply of water to the tank, and a water collection channel disposed proximate a base of the tank, where the water collection channel is provided to collect water leaked from the tank. The water tank further includes a leakage mitigation system configured to shut-off the supply of water to the tank based on a volume of water leaked from the tank.

The leakage mitigation system includes a leakage detection device disposed proximate the base of the tank and coupled to the water collection channel to receive the water leaked from the tank. The leakage detection device includes a canister configured to: (i) contain a first reactant and a second reactant and, (ii) based on a volume of liquid leaked from the tank, allow the first reactant and the second reactant to react with each other to produce a gas. In an implementation, the first reactant is sodium bicarbonate and the second reactant is acetic acid. The leakage mitigation system further includes a shut-off valve coupled to an inlet pipe of the tank. The shut-off valve is configured to allow flow of liquid through the inlet pipe in an open condition and restrict flow of liquid through the inlet pipe in a closed condition. The leakage mitigation system also includes a conduit extending between the leakage detection device and the shut-off valve, where the conduit is configured to allow flow of the gas from the leak detection device to the shut-off valve. The shut-off valve is configured to actuate between the open condition and the closed condition based on pressure exerted thereon by the flow of the gas.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which:

FIG. 4A is a cross-sectional view of the leakage detection device in a first condition, according to another embodiment of the present disclosure;

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Aspects of the present disclosure are directed to a leakage mitigation system which uses gas produced as a result of a chemical reaction to trigger a preventive action when leakage of water from an appliance, such as a water heater, is detected. According to the aspects of the present disclosure, the leakage mitigation system includes mechanical components, thereby providing low-cost solutions to mitigate water leakage.

Figure 1:
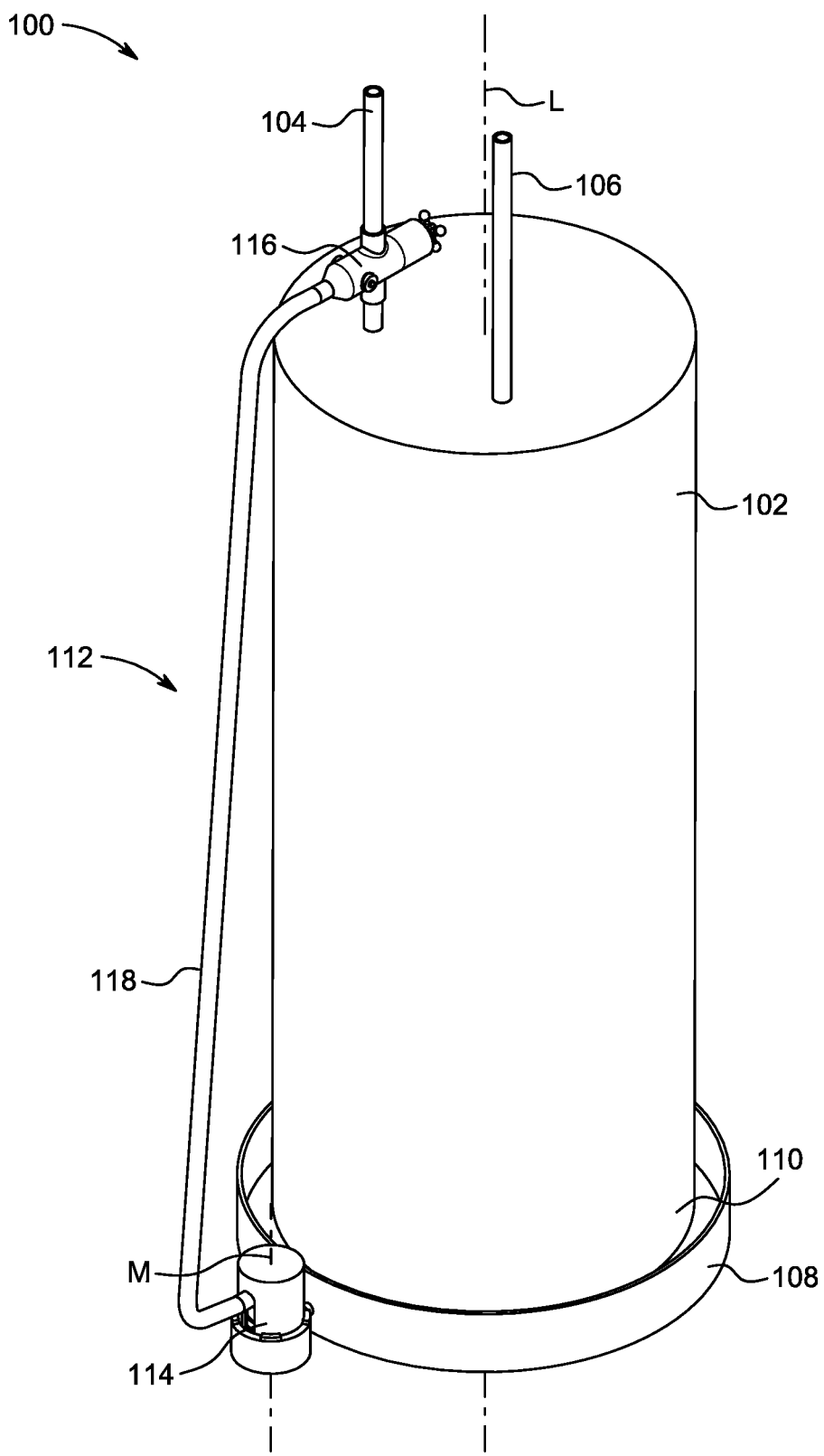
FIG. 1 is a perspective view of a water heater implementing a leakage mitigation system, according to an embodiment of the present disclosure.

Referring to FIG. 1, a perspective view of a water heater 100 is illustrated. The water heater 100 includes a tank 102 having a longitudinal axis 'L', an inlet pipe 104 configured to allow supply of water to the tank 102, and an outlet pipe 106 configured to extract heated water from the tank 102. In an embodiment, the inlet pipe 104 may be implemented as a dip tube. The water heater 100 further includes a water collection channel 108 disposed proximate a base 110 of the tank 102. The water collection channel 108 is embodied as a tray configured to collect water leaked from the tank 102.

In an embodiment, the water heater 100 further includes a leakage mitigation system 112 configured to shut-off the supply of water to the tank 102 based on a volume of water leaked from the tank 102. The leakage mitigation system 112 includes a leakage detection device 114 disposed proximate the base 110 of the tank 102 and coupled to the water collection channel 108 to receive the water leaked from the tank 102. The leakage mitigation system 112 further includes a shut-off valve 116 coupled to the inlet pipe 104. The shut-off valve 116 is configured to allow flow of liquid, such as water, through the inlet pipe 104 in an open condition 'S1' (see FIG. 5A) and restrict flow of liquid through the inlet pipe 104 in a closed condition 'S2' (see FIG. 5B). A conduit 118 of the leakage mitigation system 112 extends between the leakage detection device 114 and the shut-off valve 116.

Figure 7:
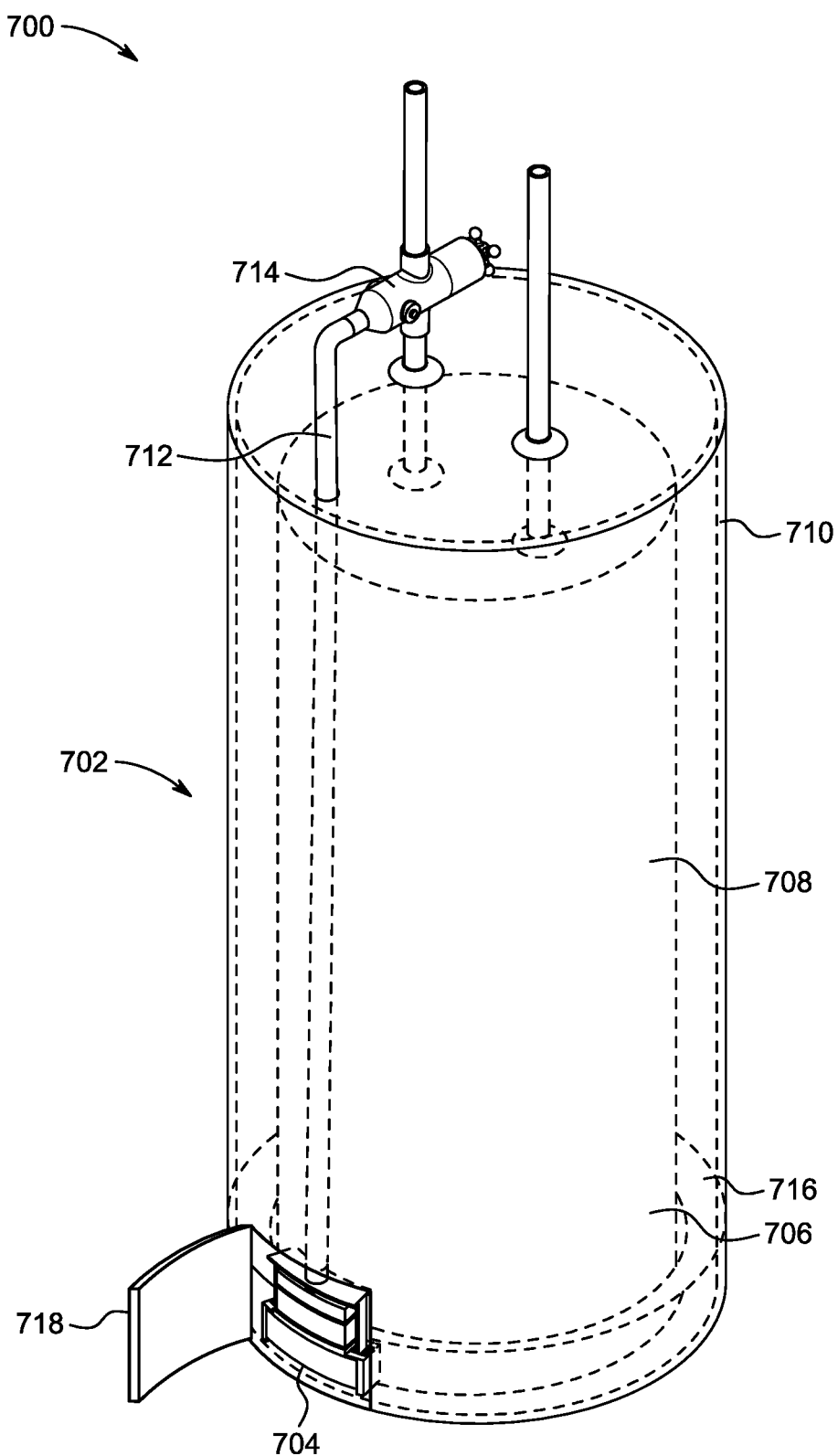
FIG. 7 is a perspective view of a water heater implementing a leakage mitigation system, according to another embodiment of the present disclosure.

In an embodiment, the water heater 100 may include a jacket (as shown in FIG. 7) to conceal the tank 102 and the water collection channel 108, and the leakage detection device 114 may be located outside the jacket. In such an arrangement, the conduit 118 may extend through the jacket. In another embodiment, the jacket may conceal the tank 102, the leakage detection device 114 and the conduit 118. Thus, the jacket may enhance the aesthetics of the water heater 100. According to an aspect of the present disclosure, the water heater 100 may be embodied as a gas water heater or an electric water heater.

Figure 2:
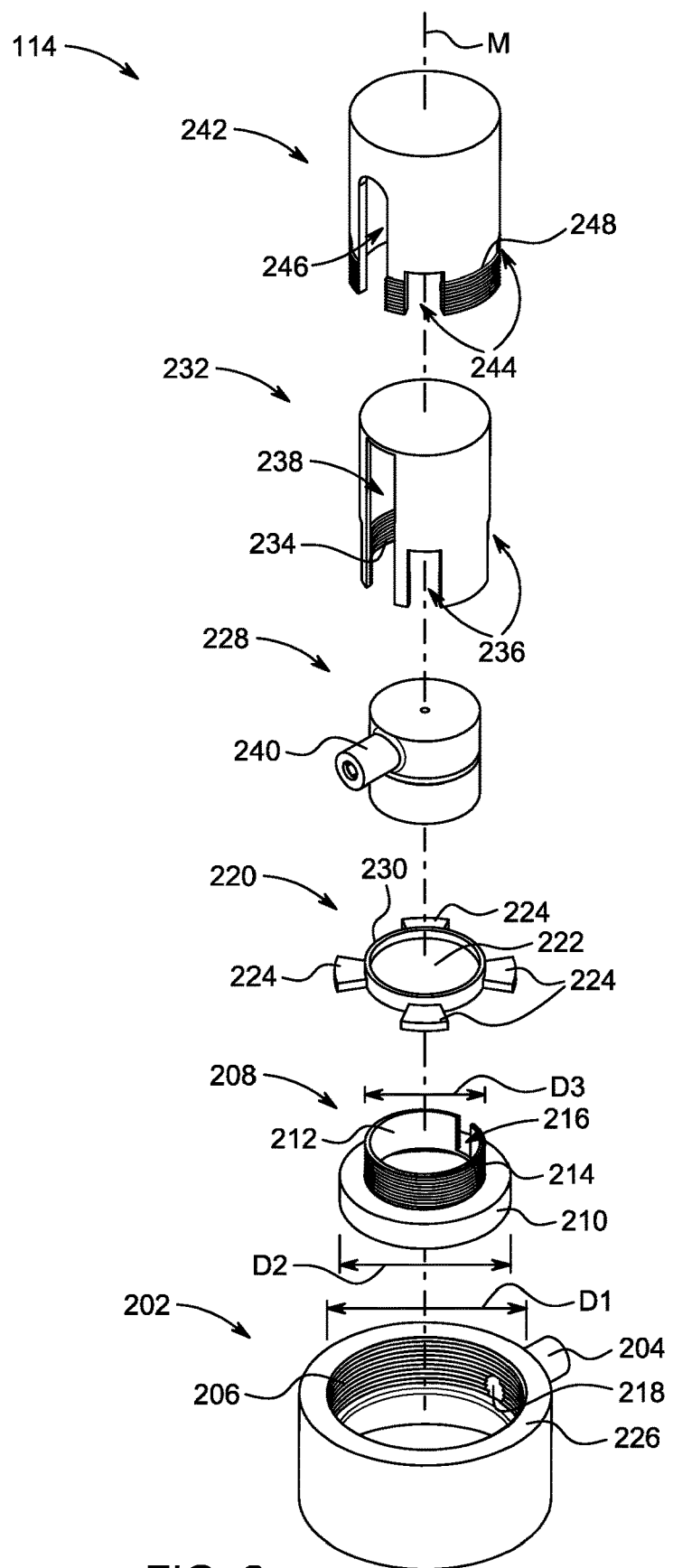
FIG. 2 is an exploded view of a leakage detection device of the leakage mitigation system, according to an embodiment of the present disclosure.

FIG. 2 illustrates an exploded view of the leakage detection device 114. In an embodiment, the leakage detection device 114 includes a collection chamber outer shell 202 configured to couple to the water collection channel 108. For example, the collection chamber outer shell 202 includes a pipe 204 configured to fluidly connect with the water collection channel 108. The length of the pipe 204 may be predetermined, such that the leakage detection device 114 is positioned proximal to the water collection channel 108. Such proximity of the leakage detection device 114 to the tank 102 does not render the water heater 100 bulky when covered with the jacket. In another embodiment, the pipe 204 may be integral to the water collection channel 108 and the collection chamber outer shell 202 may be coupled to the pipe 204. In yet another embodiment, the pipe 204 may be an external component and may be used to couple the collection chamber outer shell 202 with the water collection channel 108. Further, the collection chamber outer shell 202 includes an inner surface having an inner diameter 'D1' and threads 206 formed on the inner surface. Particularly, the threads 206 are provided for a predetermined length of the collection chamber outer shell 202.

The leakage detection device 114 further includes a liquid collection chamber 208 configured to receive the liquid, such as the water, leaked from the tank 102. In an embodiment, size of the liquid collection chamber 208 may be defined based on volume of the tank 102. The liquid collection chamber 208 includes a hollow base 210 having an outer diameter 'D2' that is less than the inner diameter 'D1' of the collection chamber outer shell 202. The liquid collection chamber 208 includes an engagement portion 212 having an outer diameter 'D3' that is less than the outer diameter 'D2' of the hollow base 210. The engagement portion 212 includes threads 214 on its outer surface thereof and defines a slit 216 extending along a longitudinal axis 'M' of the leakage detection device 114.

Due to the difference between the outer diameter 'D2' of the hollow base 210 of the liquid collection chamber 208 and the inner diameter 'D1' of the collection chamber outer shell 202, the liquid collection chamber 208 can be disposed inside the collection chamber outer shell 202. In a disposed condition, the slit 216 may be aligned with an opening 218 defined in the collection chamber outer shell 202, where the opening 218 fluidly communicates with the pipe 204. As such, the water leaked from the tank 102 and collected in the water collection channel 108 can flow into the liquid collection chamber 208 via the pipe 204 and the opening 218.

In an embodiment, the leakage detection device 114 further includes a platform 220 configured to rest on the collection chamber outer shell 202. For example, the platform 220 includes a receiving portion 222 and arms 224 extending radially outward from the receiving portion 222. The arms 224 are configured to rest on a surface 226 of the collection chamber outer shell 202. Number of arms 224 shown in FIG. 2 is only for the purpose of brevity and clarity and should not be construed as limiting. Further, the platform 220 is configured to support thereon a canister 228 of the leakage detection device 114. For example, the receiving portion 222 of the platform 220 may be dimensioned to receive the canister 228 thereon. A periphery of the receiving portion 222 includes a retaining portion 230 to snugly receive and retain the canister 228 on the platform 220. In some embodiments, the canister 228 may be releasably coupled to the platform 220. For example, the canister 228 may be press fitted on the platform 220. In another example, the canister 228 may be snap fitted to the platform 220. In yet another example, the canister 228 may be threadably engaged with the platform 220.

The leakage detection device 114 further includes a shell 232 that extends along the longitudinal axis 'M' thereof. Further, the shell 232 includes threads 234 on an inner surface thereof and configured to engage with the threads 214 of the engagement portion 212 of the liquid collection chamber 208. The shell 232 also defines a first set of slots 236 located radially along a periphery thereof and corresponding to location of the arms 224 of the platform 220. In an embodiment, length and diameter of the shell 232 may be predetermined based on length and diameter of the canister 228, to allow the shell 232 to conceal the canister 228. Furthermore, the shell 232 also defines a first cut-out 238 configured to receive a conduit connector 240 of the canister 228. Once the canister 228 is mounted on the platform 220, the first cut-out 238 and a first set of slots 236 of the shell 232 may be aligned with the conduit connector 240 of the canister 228 and the arms 224 of the platform 220, respectively. The shell 232 may then be moved coaxially towards the canister 228 to conceal the canister 228. Subsequently, the threads 214 of the engagement portion 212 of the liquid collection chamber 208 may be engaged with the threads 234 of the shell 232. In such an arrangement, the platform 220 remains coaxially disposed between the liquid collection chamber 208 and the shell 232.

The leakage detection device 114 further includes an outer cover 242 extending along the longitudinal axis 'M'. The outer cover 242 defines a second set of slots 244 located radially along a periphery thereof and corresponding to the location of arms 224 of the platform 220. A second cut-out 246 defined in the outer cover 242 extends along the longitudinal axis 'M' and is configured to receive the conduit connector 240. Further, the outer cover 242 includes threads 248 configured to engage with the threads 206 of the collection chamber outer shell 202. The diameter and length of the outer cover 242 may be predetermined based on the inner diameter 'D1' of the collection chamber outer shell 202 and the length of the shell 232, so that the outer cover 242 can sufficiently conceal the shell 232, and the threads 248 of the outer cover 242 can engage with the threads 206 of the collection chamber outer shell 202. Once the shell 232 is engaged with the canister 228 and the platform 220, the outer cover 242 may be aligned with respect to the longitudinal axis 'M', such that the second cut-out 246 is aligned with the conduit connector 240 and the each of the second set of slots 244 is aligned with a respective arm 224 of the platform 220. The outer cover 242 may then be moved coaxially to conceal the shell 232. Subsequently, the collection chamber outer shell 202 may be threadably engaged with the outer cover 242 to constitute the leakage detection device 114.

Figure 3:
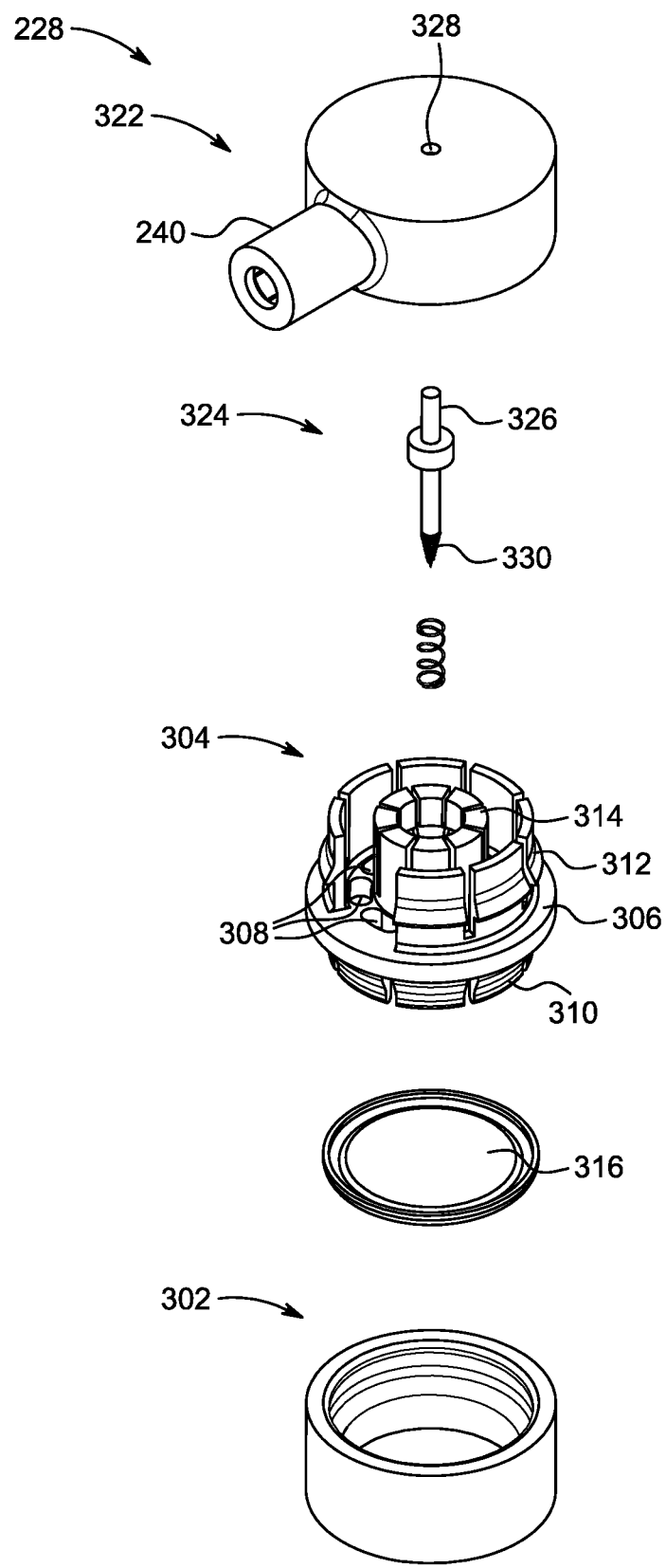
FIG. 3 is an exploded view of a canister of the leakage detection device, according to an embodiment of the present disclosure.

FIG. 3 illustrates an exploded view of the canister 228. Although components of the canister 228 have been illustrated to include circular cross-section, it will be appreciated that each or some components of the canister 228 may have a square, a rectangular, or a polygonal cross-section. In an embodiment, the canister 228 includes a reactant chamber 302 and a chamber connector 304 fluid-tightly attached to the reactant chamber 302. For example, the chamber connector 304 may be press fitted with the reactant chamber 302. In an embodiment, the chamber connector 304 includes a support portion 306 defining multiple apertures 308, a first coupling portion 310 extending from the support portion 306 and configured to couple with the reactant chamber 302, and a second coupling portion 312 extending from the support portion 306 in a direction opposite to the first coupling portion 310. Preferably, the first coupling portion 310 has a diameter less than a diameter of the reactant chamber 302. As such, an outer surface of the first coupling portion 310 is configured to abut an inner surface of the reactant chamber 302 when the chamber connector 304 is press fitted with the reactant chamber 302. In some embodiments, the diameter of the first coupling portion 310 may be greater than the diameter of the reactant chamber 302. In such configuration, an inner surface of the first coupling portion 310 may be configured to abut an outer surface of the reactant chamber 302 when the chamber connector 304 is press fitted with the reactant chamber 302. In some embodiments, the first coupling portion 310 may be threadably engaged with the reactant chamber 302. Further, the second coupling portion 312 extends partially along a periphery of the support portion 306 as illustrated in FIG. 3. The chamber connector 304 further includes a central portion 314 extending concentric to the second coupling portion 312, such that the apertures 308 are exposed to an annular space formed between the central portion 314 and the second coupling portion 312.

The canister 228 further includes a diaphragm 316 disposed therein. In an embodiment, the diaphragm 316 may be coupled to an open end of the first coupling portion 310. As such, when the chamber connector 304 is press fitted with the reactant chamber 302, the diaphragm 316 may be fluid-tightly disposed between the reactant chamber 302 and the chamber connector 304. In another embodiment, the diaphragm 316 may be fluid-tightly coupled to the inner surface of the reactant chamber 302. In yet another embodiment, the diaphragm 316 may be fluid-tightly coupled to a periphery of an open end of the reactant chamber 302. With such arrangement, the diaphragm 316 defines a first chamber 318 (see FIGS. 4A and 4B) in the reactant chamber 302 configured to contain a first reactant 'R1', and a second chamber 320 (see FIGS. 4A and 4B) in the chamber connector 304 configured to contain a second reactant 'R2'. As such, the diaphragm 316 separates the first reactant 'R1' from the second reactant 'R2'. In an embodiment, the first reactant 'R1' is a solid reactant, such as sodium bicarbonate, and the second reactant 'R2' is a liquid reactant, such as acetic acid (low-concentration acid of about 0.57M with $pK_a$ value about 4.76).

Therefore, it will be understood that the reactant chamber 302 and the chamber connector 304 may be made of material which are non-reactive to the chemicals contained therein. For example, the reactant chamber 302 may be made of borosilicate glass, such as Pyrex®, which is commonly used as laboratory glassware. In some examples, the borosilicate glass may be covered with an injection molded plastic on an outer surface thereof to prevent any scratch. Likewise, the chamber connector 304 may be made of a high or low density polyethylene (HDPE, LDPE), or polypropylene (PP) which are commonly known for exhibiting inert characteristic with respect to storing the acetic acid. Since these chemicals and materials are commercially available at low cost, a cost-effective canister 228 may be achieved. However, other chemicals and materials known to a person skilled in the art may be implemented. Further, the combination of the described first reactant 'R1' and the second reactant 'R2' produces sodium acetate, carbon-dioxide, and water. However, other acidic substances and alkaline substances may be used in the canister 228, which upon reaction with each other at room temperature produces a gas, such as the carbon-dioxide.

The canister 228 further includes a cap member 322 configured to fluid tightly attach with the chamber connector 304. The conduit connector 240 extends radially outward from the cap member 322 and is configured to couple with the conduit 118. To this end, the term 'fluid-tightly' may be understood as an arrangement to prevent mixing of the reactants or prevent loss of the gas produced as a result of reaction of the reactants. The leakage detection device 114, particularly the canister 228, further includes a puncture member 324 extending through the chamber connector 304 and configured to puncture the diaphragm 316, thereby allowing the first reactant 'R1' to react with the second reactant 'R2'. In an assembled state of the canister 228, a first end 326 of the puncture member 324 extends through a hole 328 defined in the cap member 322 and a second end 330 of the puncture member 324 includes a tapered serrated surface capable of puncturing the diaphragm 316. In another embodiment, the first end 326 of the puncture member 324 may be coupled to the shell 232.

Further, in an embodiment, the diaphragm 316 may be made of a chemically resilient material which exhibit properties of low tensile strength and low water absorption properties, to allow easy puncturing thereof. In an embodiment, the diaphragm 316 is made of one of a neoprene rubber, ethylene propylene diene monomer rubber, nitrile rubber, acrylonitrile butadiene rubber, or latex rubber. Preferably, the diaphragm 316 is embodied as ⅟₁₆ inch neoprene rubber membrane.

Figure 4B:
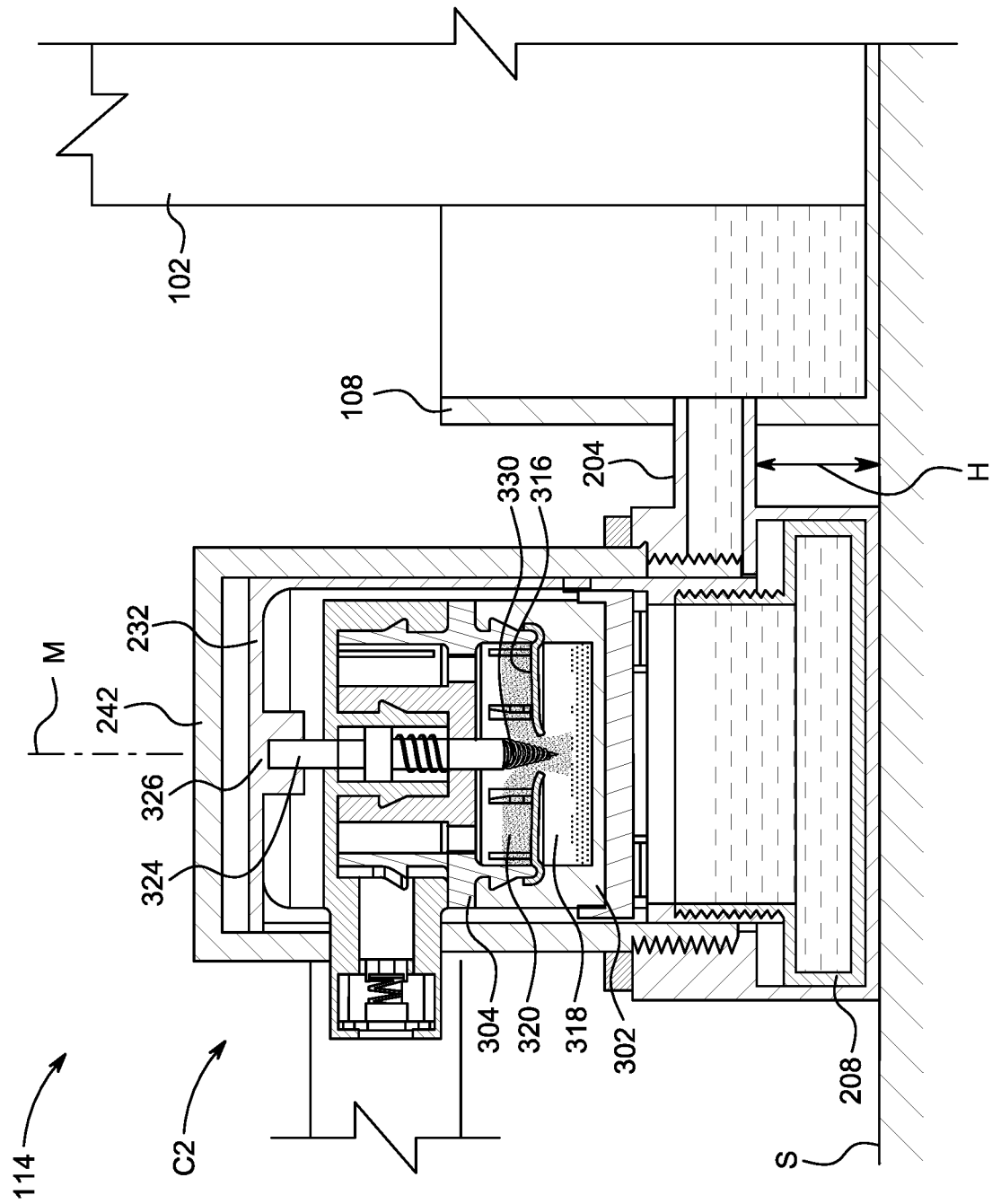
FIG. 4B is a cross-sectional view of the leakage detection device in a second condition, according to another embodiment of the present disclosure.

FIG. 4A illustrates a cross-sectional view of the leakage detection device 114 in a first condition 'C1' and FIG. 4B illustrates a cross-sectional view of the leakage detection device 114 in a second condition 'C2'. FIG. 4A and FIG. 4B will be described in conjunction with FIG. 2 and FIG. 3.

The pipe 204 is connected to the water collection channel 108 at a height 'H' from a floor surface 'S'. As such, when the leaked water collected in the water collection channel 108 is below the height 'H', the leaked water does not flow through the pipe 204 and hence may not be detected by the leakage detection device 114. As used herein, the first condition' refers to a state of the leakage detection device 114 when no leakage of water is detected or when a level of water collected in the water collection channel 108 is below the height 'H'. The term 'second condition' refers to a state of the leakage detection device 114 when the level of water collected in the water collection channel 108 is above the height 'H'.

In case of heavy leakage of water from the tank 102, level of water collected in the water collection channel 108 increases beyond the height 'H' and thus flows through the pipe 204. Since the pipe 204 is in fluid communication with the liquid collection chamber 208, the water gets collected in the liquid collection chamber 208. Due to the coupling between the liquid collection chamber 208 and the shell 232, and by virtue of gravity, the liquid collection chamber 208 and the shell 232 are together configured to move along the longitudinal axis 'M' of the leakage detection device 114 with respect to the canister 228, based on a volume of liquid collected in the liquid collection chamber 208. Here, it may be noted that a volume of water leaked from the tank 102 may be different from the volume of water collected in the liquid collection chamber 208. In some embodiments, the leakage detection device 114 may include a spring (not shown) connected to an inner surface of a top portion of the outer cover 242 and an outer surface of a top portion of the shell 232. The spring may be configured to retain the liquid collection chamber 208 and the shell 232 stationary corresponding to the first condition 'C1' of the leakage detection device 114. Collection of water in the liquid collection chamber 208 adds to the collective weight of the liquid collection chamber 208 and the shell 232. Once such collective weight reaches a value greater than a biasing force of the spring, the liquid collection chamber 208 and the shell 232 may be allowed to move along the longitudinal axis 'M' of the leakage detection device 114. Other means of retaining the liquid collection chamber 208 and the shell 232 stationary corresponding to the first condition 'C1' of the leakage detection device 114, until the collection of water in the liquid collection chamber 208, may be apparent to the person skilled in the art from the description hereinabove.

Based on the volume of liquid leaked from the tank, the canister 228 is configured to allow the first reactant 'R1' and the second reactant 'R2' to react with each other to produce the gas, such as the carbon-dioxide. The movement of the liquid collection chamber 208 and the shell 232 exerts a force at the first end 326 of the puncture member 324, thereby pushing the puncture member 324 in the direction of exerted force. As a result, the second end 330 of the puncture member 324 punctures the diaphragm 316, thereby allowing the second reactant 'R2' to be introduced into the first chamber 318 containing the first reactant 'R1' to produce the gas. As described earlier, the reaction between the first reactant 'R1' and the second reactant 'R2' produces the gas, such as the carbon-dioxide. In some embodiments, the canister 228 may include a housing (not shown) and the puncture member 324 may be configured to puncture the diaphragm 316 upon movement of the liquid collection chamber 208 and the shell 232 within the housing along the longitudinal axis 'M' of the leakage detection device 114. The produced gas rises upwards and flows through the apertures 308 (see FIG. 3) defined in the support portion 306 of the chamber connector 304 to reach the annular space defined between the second coupling portion 312 and the central portion 314. Since the annular space is in fluid communication with the conduit connector 240 and the conduit 118, the gas flows into the conduit 118. In an embodiment, the conduit 118 is configured to allow flow of the gas from the leakage detection device 114 to the shut-off valve 116.

In some embodiments, based on the volume of water received in the liquid collection chamber 208, the canister 228 may be allowed to move towards the puncture member 3124 while the puncture member 324 remains stationary. In some embodiments, the leakage detection device 114 may include a wicking mechanism to absorb water from the water collection channel 108 into the liquid collection chamber 208. Such mechanisms may allow the leakage detection device 114 to detect leakage on real time basis.

Figure 5A:
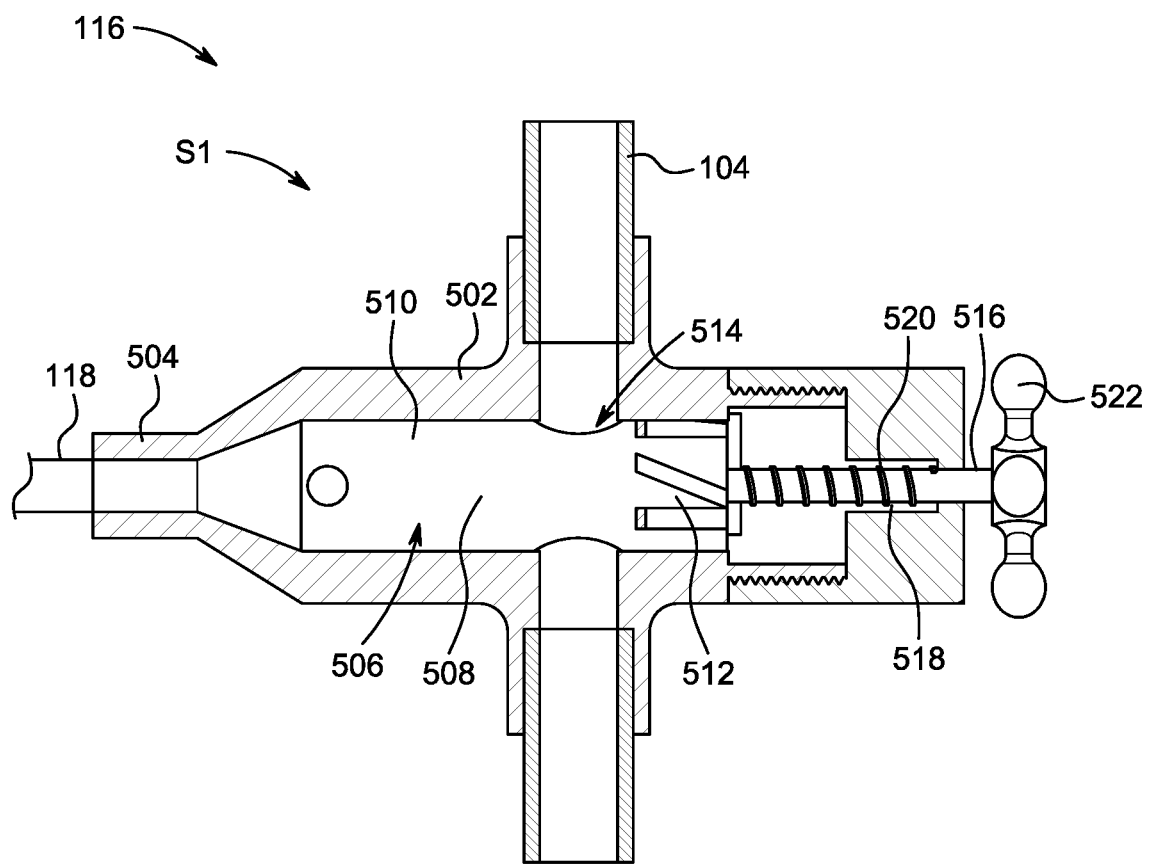
FIG. 5A is a cross-sectional view of the shut-off valve in an open condition, according to an embodiment of the present disclosure.
Figure 5B:
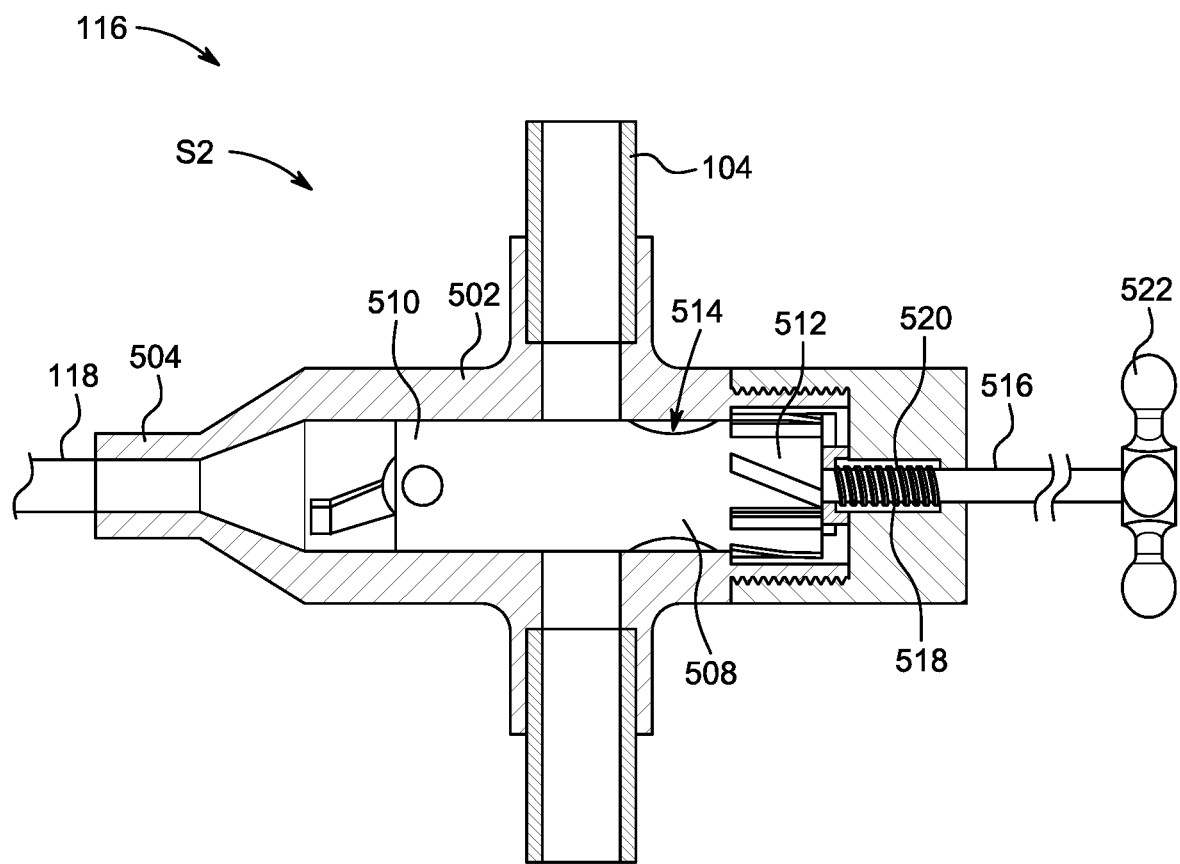
FIG. 5B is a cross-sectional view of the shut-off valve in a closed condition, according to an embodiment of the present disclosure

FIG. 5A illustrates a cross-sectional view of the shut-off valve 116 in the open condition 'S1' and FIG. 5B illustrates a cross-sectional of the shut-off valve 116 in the closed condition 'S2'. In an embodiment, the shut-off valve 116 includes an elongated housing 502 defining a first opening 504 configured to fluidly couple with the conduit 118 (also shown in FIG. 1) and receive the gas produced in the canister 228. The shut-off valve 116 further includes a plunger 506 movably received within the elongated housing 502 and configured to actuate the shut-off valve 116 between the open condition 'S1' and the closed condition 'S2' based on pressure exerted thereon by flow of the gas. In cases where water heaters include inlet pipe(s) located at the bottom thereof or anywhere on the tank 102, the length of the conduit 118 extending between corresponding leakage detection device and shut-off valve may be reduced. As such, quantity of the first reactant 'R1' and the second reactant 'R2' in the canister may be predetermined and provided accordingly. For example, the quantity of the first reactant 'R1', such as the sodium bicarbonate, may be about 1.18 g and the quantity of the second reactant 'R2', such as the acetic acid, may be about 0.665 mL. In some embodiments, the leakage detection device 114 may include two or more canisters configured to allow respective first reactants to react with corresponding second reactants simultaneously, thereby achieving sufficiency of pressure of produced gas and thus sufficiency of force to actuate the shut-off valve from the open condition to the closed condition. In some embodiments, pressure in a range of about 0.5 MPa to about 1.5 MPa may be developed by the produced gas to actuate the shut-off valve from the open condition 'S1' to the closed condition 'S2'.

In an embodiment, the plunger 506 includes a cylindrical body 508 having a first end 510 and a second end 512 distal to the first end 510, where the first end 510 is located proximate the first opening 504 of the elongated housing 502. The cylindrical body 508 defines a through-hole 514 which remains aligned (see FIG. 5A) with the inlet pipe 104 of the tank 102 in the open condition 'S1' of the shut-off valve 116 and remains unaligned (see FIG. 5B) with the inlet pipe 104 in the closed condition 'S2' of the shut-off valve 116. As such, the plunger 506 allows flow of water through the inlet pipe 104 in the open condition 'S1' and restricts flow of water through the inlet pipe 104 in the closed condition 'S2'. In an embodiment, the canister 228 may include enough quantity of the first reactant 'R1' and the second reactant 'R2' to produce sufficient gas to exert force on the plunger 506 to actuate the shut-off valve 116 to the closed condition 'S2'. Additionally, in an embodiment, the conduit connector 240 may include a mechanism to allow flow of gas through the conduit 118 only when pressure of the gas is above a predetermined threshold. This may ensure the requirement of sufficiency of pressure of the gas on the plunger 506 considering a distance the gas needs to flow through between the leakage detection device 114 located at bottom of the water heater 100 to the shut-off valve 116 located at top of the water heater 100.

In an embodiment, the plunger 506 further includes an arm 516 extending from the second end 512 of the cylindrical body 508 and protruding through a second opening 518 defined in the elongated housing 502. The plunger 506 further includes a biasing member 520 disposed around the arm 516 and configured to resiliently support the plunger 506 within the elongated housing 502. The biasing member 520 may be designed such that a minimum biasing force is incident on the second end 512 of the cylindrical body 508 compared to the force exerted by the gas on the first end 510 of the cylindrical body 508. Since the shut-off valve 116 is exposed to the environment in which the water heater 100 is located, more often than not, temperature of the environment may cause short moments of pressure to build inside the shut-off valve 116, which may lead to false actuation of the shut-off valve 116. The biasing force of the biasing member 520 may prevent such false actuations. In an embodiment, the shut-off valve 116 further includes a handle 522 connected to the arm 516 and configured to reset the shut-off valve 116 to the open condition 'S1' from the closed condition 'S2'. Although the biasing member 520 is depicted as a spring, in some examples, compressible foam may also be used.

Figure 6A:
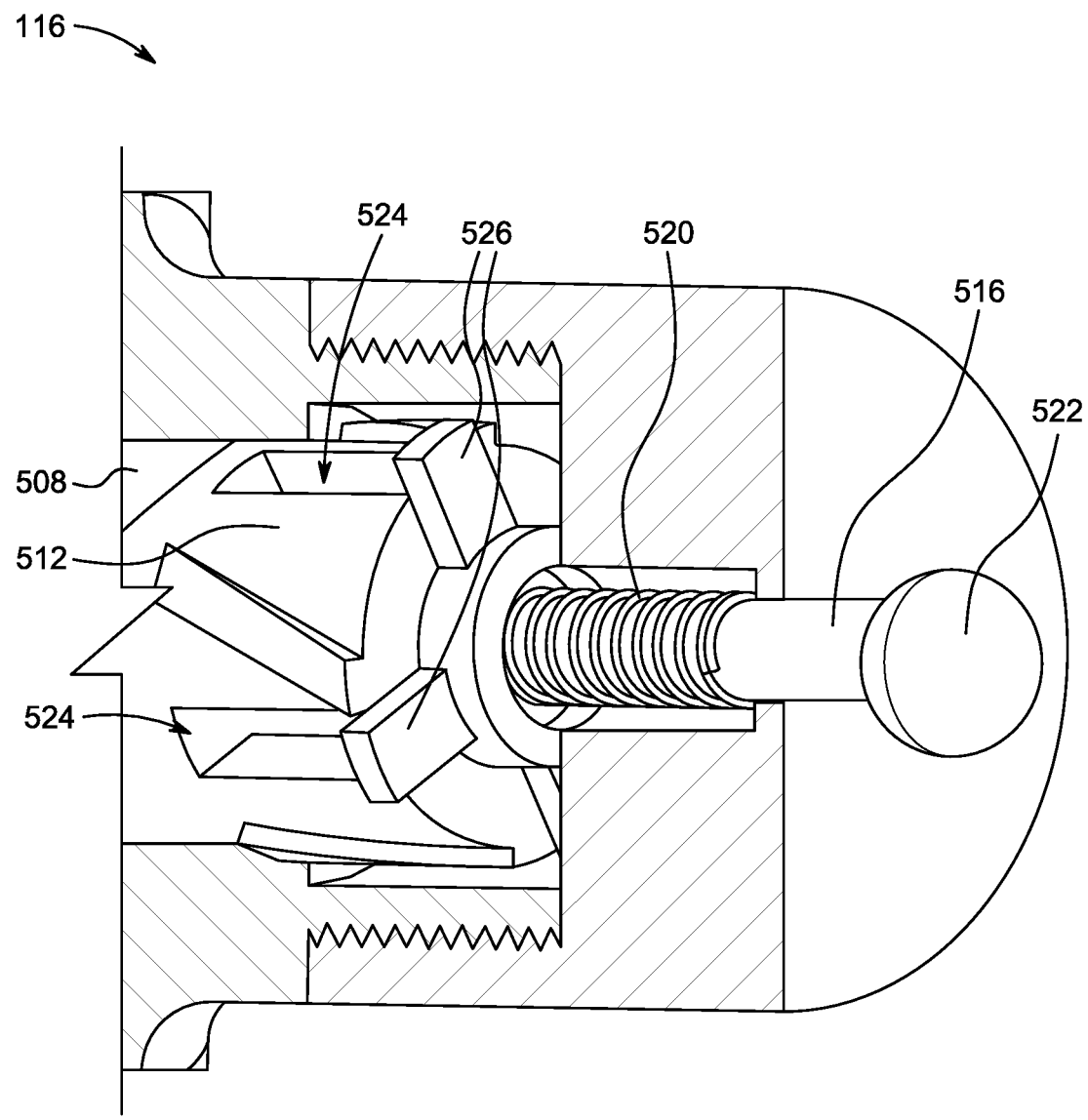
FIG. 6A is a cross-sectional view of the shut-off valve showing a handle of the shut-off valve disengaged with a plunger of the shut-off valve, according to another embodiment of the present disclosure.
Figure 6B:
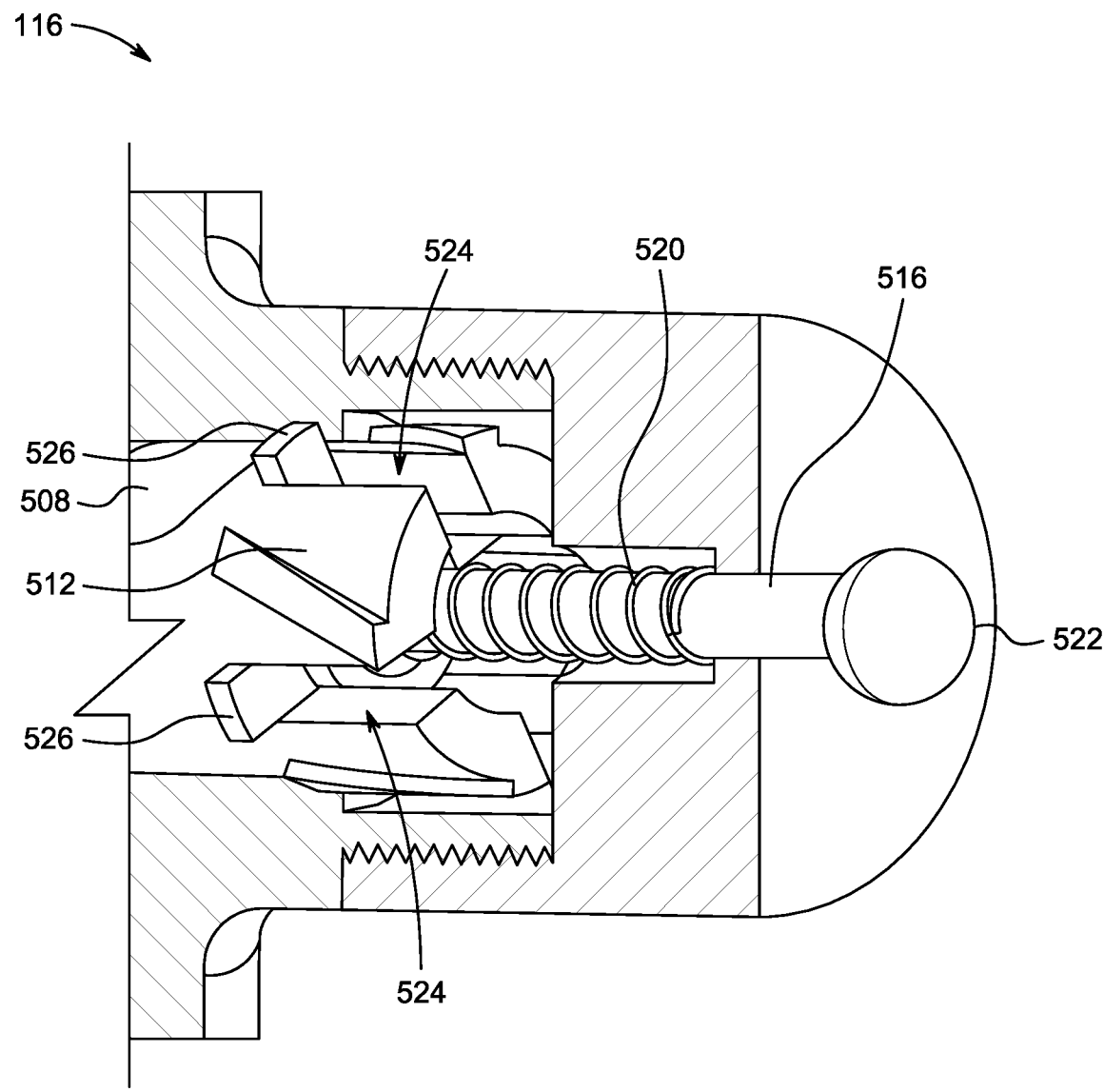
FIG. 6B is a cross-sectional view of the shut-off valve showing the handle engaged with the plunger, according to another embodiment of the present disclosure.

FIG. 6A illustrates a cross-sectional view of the shut-off valve 116 showing the arm 516 disengaged from the plunger 506 and FIG. 6B illustrates a cross-sectional view of the shut-off valve 116 showing the arm 516 engaged with the plunger 506. Specifically, FIG. 6B illustrates a position of the arm 516 and the handle 522 (illustrated partially for the purpose of brevity) when the shut-off valve 116 is reset to the open condition 'S1'. When the pressure exerted by the gas on the cylindrical body 508 is greater than the biasing force of the biasing member 520, the cylindrical body 508 is moved against the biasing force of the biasing member 520, thereby compressing the biasing member 520 as depicted in FIG. 5B and FIG. 6A. In an embodiment, the second end 512 of the cylindrical body 508 defines multiple grooves 524 spaced radially along a periphery thereof and the arm 516 includes jaws 526 configured to engaged with corresponding grooves 524. In the closed condition 'S2' of the shut-off valve 116, the jaws 526 remain disengaged from the grooves 524 as shown in FIG. 6A.

In order to reset the shut-off valve 116 to the open condition 'S1', the handle 522 may be rotated until the jaws 526 are aligned with the grooves 524. Upon alignment, the biasing force of the biasing member 520 causes the jaws 526 to engage with the grooves 524, thereby allowing movement of the handle 522 in a direction inward with respect to the shut-off valve 114. Further manual push force through the handle 522 allows the shut-off valve 114 to be actuated to the open condition 'S1'. Prior to resetting the shut-off valve 114, used canister 228 may be replaced with a new canister. The threading engagement between components of the leakage detection device 114 (as described with respect to FIG. 2) allows easy dismantling and replacement of the used canister 228. As described earlier, in an embodiment, the first reactant 'R1' may be sodium bicarbonate and the second reactant 'R2' may be acetic acid. Reaction between the two reactants produces sodium acetate, carbon-dioxide, and water. Sodium acetate is commonly used as a food preservative and hence biodegradable. Additionally, sodium acetate is not considered as hazardous waste and hence can be disposed without special procedures. In some embodiments, the housing of the canister 228 may be made of stainless steel or polyvinyl chloride (PVC) and hence may be disposed easily without special procedures. As such, the present disclosure eases the replacement and disposal of the used canister 228. In addition, stainless steel and PVC are commercially available materials for minimum cost. There-fore, the new canisters do not substantially add to the cost of maintenance of the leakage detection device 114.

FIG. 7 illustrates a perspective view of a water heater 700 implementing a leakage mitigation system 702, according to another embodiment of the present disclosure. The leakage mitigation system 702 includes a leakage detection device 704 located proximal to a base 706 of a tank 708 of the water heater 700. Specifically, the leakage detection device 704 has an arcuate structure conforming to shape of the tank 708 and is concealed by a jacket 710 of the water heater 700. As such, a conduit 712 extending between the leakage detection device 704 and a shut-off valve 714 also remains partially concealed within the jacket 710. In an example, components of the leakage detection device 704 may be manufactured from injection molding, casting, or 3D printing. The water heater 700 further includes a water collection channel 716 disposed proximal the base 706 and configured to collect water leaked from the tank 708. Additionally, the water collection channel 716 is positioned such that the leaked water is directed into the leakage detection device 704. For the purpose of accessing the leakage detection device 704, the jacket 710 includes a door 718. In cases where the maintenance activity needs to be performed on the leakage detection device 704, the user may be allowed to easily access the leakage detection device 704 by opening the door 718. In an embodiment, size of an opening in the jacket 710 that provides access to the leakage detection device 704 may be sufficiently large to allow manual disengagement of the conduit 712 from the leakage detection device 704 and easy removal of the leakage detection device 704 out of the jacket 710.

Figure 8:
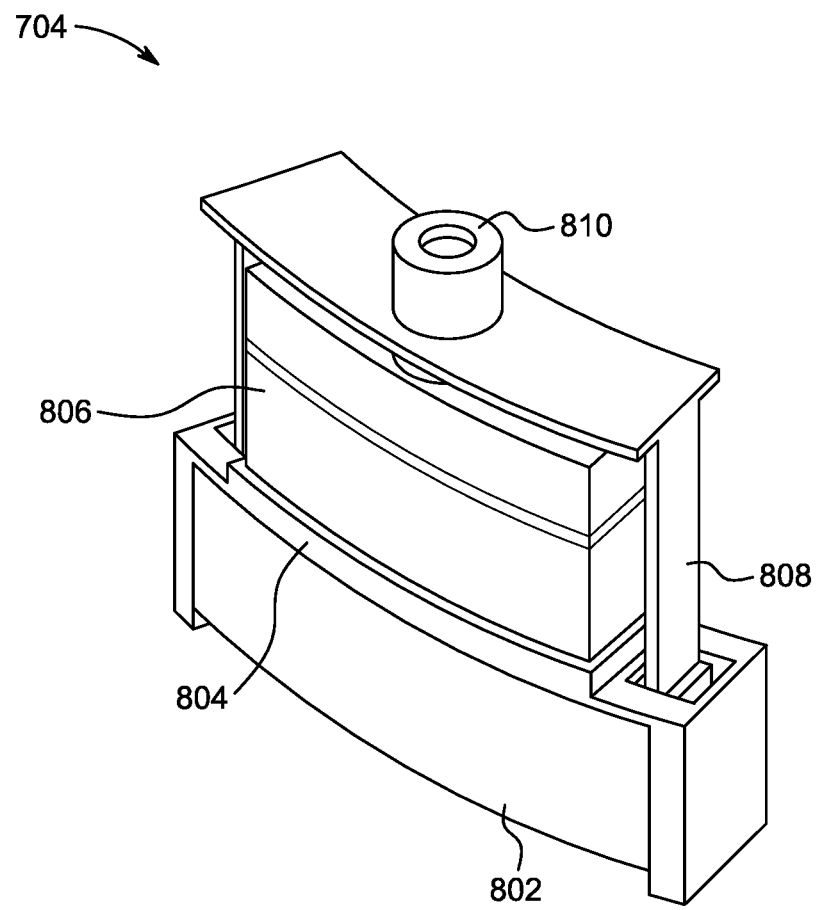
FIG. 8 is a perspective view of a leakage detection device of the leakage mitigation system of FIG. 7, according to an embodiment of the present disclosure.

FIG. 8 illustrates a perspective view of the leakage detection device 704. In an embodiment, the leakage detection device 704 includes a water collection chamber 802 (alternatively referred to as 'liquid collection chamber' in the present disclosure) configured to couple with the water collection channel 716, a canister support platform 804 configured to couple with the water collection chamber 802, a canister 806, and a weight arm shell 808 configured to couple with the water collection chamber 802 via the canister support platform 804. In an example, the weight arm shell 808 is coupled with the water collection chamber 802 via a snap fit. A conduit connector 810 mounted on the weight arm shell 808 is configured to couple with the conduit 712.

Figure 9:
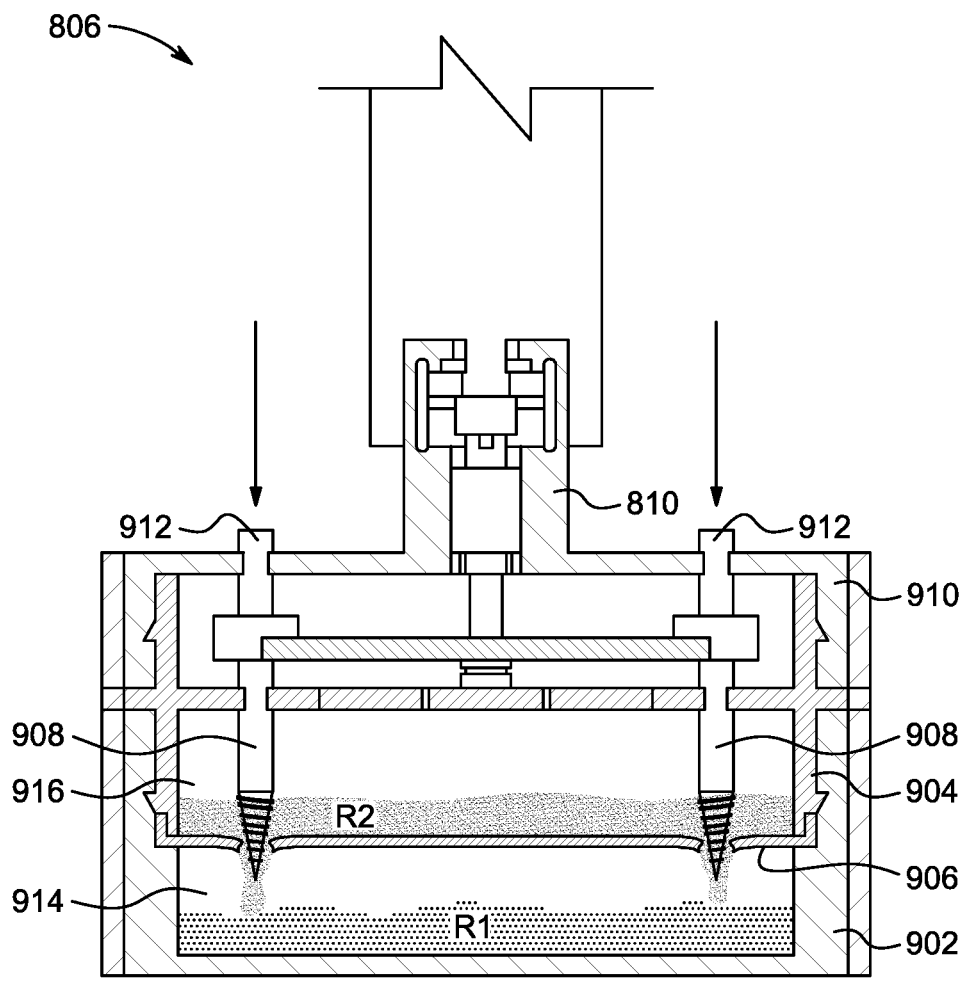
FIG. 9 is a cross-sectional view of a canister of the leakage detection device of FIG. 8, according to an embodiment of the present disclosure.

FIG. 9 illustrates a cross-sectional view of the canister 806. In an embodiment, the canister 806 includes a reactant chamber 902, a chamber connector 904, a diaphragm 906 disposed between the reactant chamber 902 and the chamber connector 904, puncture members 908 extending through the chamber connector 904, and a cap member 910 including the conduit connector 810. The diaphragm 906 defines a first chamber 914 configured to contain a first reactant 'R1' and a second chamber 916 configured to contain a second reactant 'R2'. Specifically, the first reactant 'R1' and the second reactant 'R2' are predetermined such that a reaction between the first reactant 'R1' and the second reactant 'R2' produces enough gas to actuate the shut-off valve 714 from an open condition to a closed condition.

When the water leaked from the tank 708 flows into the water collection chamber 802 through the water collection channel 716, weight of the water collection chamber 802 increases. Such increase in weight causes the water collection chamber 802 to slide in a downward direction with respect to the canister support platform 804. Since the weight arm shell 808 is coupled to the water collection chamber 802, the weight arm shell 808 moves in the downward direction, thereby applying force (depicted through arrows in FIG. 9) on free ends 912 of the puncture members 908. The force incident on the free ends 912 causes the puncture members 908 to puncture the diaphragm 906, thereby allowing the first reactant 'R1' to react with the second reactant 'R2' and produce the gas. Further, the gas is directed into the conduit 712 via the conduit connector 810 and allowed to flow to the shut-off valve 714. Based on the pressure of the gas flowing therein, the shut-off valve 714 is actuated from the open condition to the closed condition. The terms 'open condition' and 'closed condition' have the same meaning as described earlier with respect to FIG. 5A and FIG. 5B.

Figure 10:
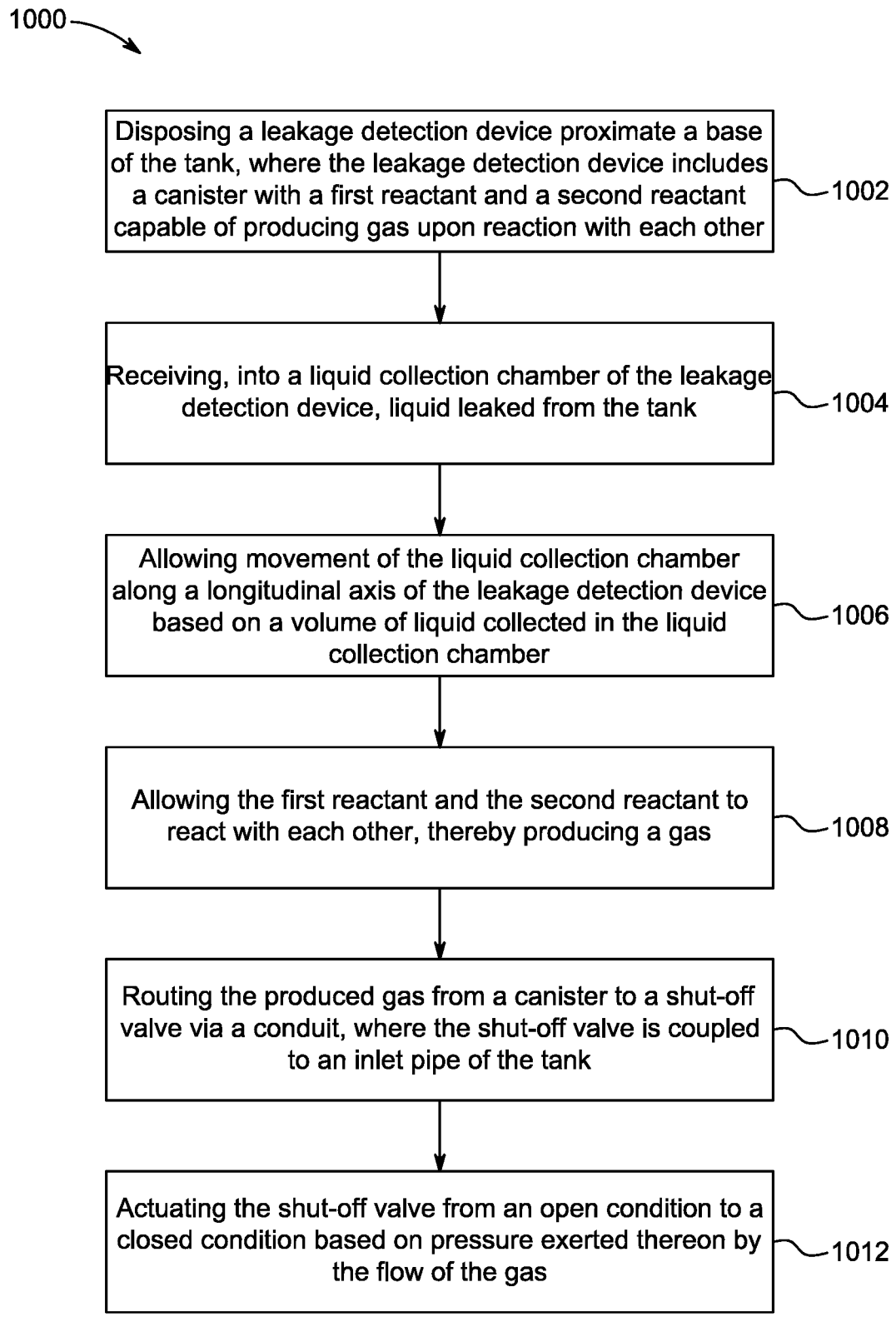
FIG. 10 is a flowchart of a method of mitigating leakage of a tank, according to aspects of the present disclosure.

FIG. 10 shows a flowchart of a method 1000 of mitigating leakage of the tank 102, 708. The method 1000 is described in conjunction with FIG. 1 to FIG. 9. In an implementation, at step 1002, the method 1000 includes disposing the leakage detection device 114, 704 proximate the base 110, 706 of the tank 102, 708. In an embodiment, the leakage detection device 114, 704 includes the canister 228, 806 configured to contain the first reactant 'R1' and the second reactant 'R2' capable of producing gas upon reaction with each other.

At step 1004, the method 1000 includes receiving, into the liquid collection chamber 208, 802 of the leakage detection device 114, 704, liquid leaked from the tank 102, 708.

At step 1006, the method 1000 includes allowing movement of the liquid collection chamber 208, 802 along the longitudinal axis 'M' of the leakage detection device 114, 704 based on the volume of liquid collected in the liquid collection chamber 208, 802.

At step 1008, the method 1000 includes allowing the first reactant 'R1' and the second reactant 'R2' to react with each other, thereby producing the gas. In an embodiment, the method 1000 at step 1008 may further include allowing one or more puncture members 324, 908 to puncture the diaphragm 316, 906 of the canister 228, 806 in response to the movement of the liquid collection chamber 208, 802, where the puncturing of the diaphragm 316, 906 allows the first reactant 'R1' to react with the second reactant 'R2', thereby producing the gas.

At step 1010, the method 1000 includes routing the produced gas from the canister 228, 806 to the shut-off valve 116, 714 via the conduit 118, 712. In an embodiment, the gas is routed to the shut-off valve 116, 714 when the pressure of the gas is above a predetermined threshold value.

At step 1012, the method 1000 includes actuating the shut-off valve 116, 714 from the open condition 'S1' to the closed condition 'S2' based on the pressure exerted thereon by the flow of the gas.

Although the present disclosure describes the aspects of the leakage mitigation system 112, 702 with respect to the water heater 100, 700, in some embodiments, the leakage mitigation system 112, 702 may be implemented in any appliance for automatic leakage detection. Examples of such appliances include, but are not limited to, washing machine, dishwashers, and reverse osmosis systems. Additionally, use of the leakage mitigation system 112, 702 is not limited to home environments, and can be implemented in commercial environments, such as, for example, restaurants and hospitals where liquid based appliances are used. Further, since the leakage mitigation system 112, 702 includes mechanical components configured to trigger a preventive action based on detection of water leakage, the leakage mitigation system 112, 702 overcomes the requirement of electric power, sensors, and control board, thereby rendering the water heater 100, 700 simple and cost-effective. Therefore, the leakage mitigation system 112, 702 can be implemented with the appliances at locations where supply of electric power remains a challenge.

All terminologies used herein is for mere purpose of describing embodiments and examples and should not be construed as limiting the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A leakage mitigation system comprising:
    a leakage detection device disposed proximate a base of a tank, the leakage detection device comprising a canister, wherein the canister is configured to: (i) contain a first reactant and a second reactant and, (ii) based on a volume of liquid leaked from the tank, allow the first reactant and the second reactant to react with each other to produce a gas;
    a shut-off valve coupled to an inlet pipe of the tank, the shut-off valve configured to allow flow of liquid through the inlet pipe in an open condition and restrict flow of liquid through the inlet pipe in a closed condition; and
    a conduit extending between the leakage detection device and the shut-off valve, the conduit configured to allow flow of the gas from the leak detection device to the shut off valve,
    wherein the shut-off valve is configured to actuate between the open condition and the closed condition based on pressure exerted thereon by the flow of the gas.

2. The leakage mitigation system of claim 1, wherein the leakage detection device comprises:
    a liquid collection chamber configured to receive the liquid leaked from the tank;
    a shell threadably coupled to the liquid collection chamber; and
    a platform coaxially disposed between the liquid collection chamber and the shell, the platform configured to support the canister thereon, wherein the liquid collection chamber and the shell are together configured to move along a longitudinal axis of the leakage detection device with respect to the canister based on a volume of liquid collected in the liquid collection chamber.

3. The leakage mitigation system of claim 1, further comprising a diaphragm disposed within the canister, wherein the diaphragm separates the first reactant from the second reactant.

4. The leakage mitigation system of claim 3, further comprising a puncture member configured to puncture the diaphragm, thereby allowing the first reactant to react with the second reactant.

5. The leakage mitigation system of claim 4, wherein the canister comprises:

a reactant chamber;
a chamber connector fluid-tightly attached to the reactant chamber, wherein the diaphragm is fluid-tightly disposed between the reactant chamber and the chamber connector to define a first chamber configured to contain the first reactant and a second chamber configured to contain the second reactant; and
a cap member fluid-tightly attached to the chamber connector and configured to couple with the conduit,
wherein the puncture member extends through to the chamber connector.

6. The leakage mitigation system of claim 4, wherein the canister comprises:
a housing, and
wherein the puncture member is configured to puncture the diaphragm upon movement of the liquid collection chamber and the shell within the housing along a longitudinal axis of the leakage detection device.

7. The leakage mitigation system of claim 1, wherein the first reactant is a solid reactant and the second reactant is a liquid reactant.

8. The leakage mitigation system of claim 7, wherein the solid reactant is sodium bicarbonate.

9. The leakage mitigation system of claim 7, wherein the liquid reactant is acetic acid.

10. The leakage mitigation system of claim 3, wherein the diaphragm is made of one of a neoprene rubber, ethylene propylene diene monomer rubber, nitrile rubber, acrylonitrile butadiene rubber, or latex rubber.

11. The leakage mitigation system of claim 1, wherein the shut-off valve comprises:
an elongated housing defining a first opening configured to: (i) fluidly couple with the conduit, and (ii) receive the gas produced in the canister; and
a plunger movably received within the elongated housing and configured to actuate the shut-off valve between the open condition and the closed condition based on pressure exerted thereon by flow of the gas.

12. The leakage mitigation system of claim 11, wherein the plunger defines a through-hole, and wherein the through-hole: (i) remains aligned with the inlet pipe of the tank in the open condition of the shut-off valve, and (ii) remains unaligned with the inlet pipe in the closed condition of the shut-off valve.

13. The leakage mitigation system of claim 11, wherein the plunger comprises:
a cylindrical body having a first end and a second end distal to the first end, the first end located proximate the first opening of the elongated housing;
an arm extending from the second end of the cylindrical body and protruding through a second opening defined in the elongated housing; and
a biasing member disposed around the arm and configured to resiliently support the plunger within the elongated housing.

14. The leakage mitigation system of claim 11, wherein the shut-off valve comprises a handle connected to the arm of the plunger, the handle configured to reset the shut-off valve to the open condition from the closed condition.

15. A method of mitigating leakage of a tank, the method comprising:
disposing a leakage detection device proximate a base of the tank, the leakage detection device comprising a canister with a first reactant and a second reactant capable of producing gas upon reaction with each other;
receiving, into a liquid collection chamber of the leakage detection device, liquid leaked from the tank;
allowing movement of the liquid collection chamber along a longitudinal axis of the leakage detection device based on a volume of liquid collected in the liquid collection chamber;
allowing the first reactant and the second reactant to react with each other, thereby producing a gas;
routing the produced gas from the canister to a shut-off valve via a conduit, the shut-off valve coupled to an inlet pipe of the tank; and
actuating the shut-off valve from an open condition to a closed condition based on pressure exerted thereon by the flow of the gas, wherein the shut-off valve is configured to allow flow of liquid through the inlet pipe in the open condition and restrict flow of the liquid through the inlet pipe in the closed condition.

16. The method of claim 15 further comprising allowing one or more puncture members to puncture a diaphragm of the canister in response to the movement of the liquid collection chamber, wherein the puncturing of the diaphragm allows the first reactant to react with the second reactant, thereby producing the gas.

17. The method of claim 15 further comprising, routing the produced gas from the canister to the shut-off valve via the conduit when a pressure of the gas is above a predetermined threshold value.

18. A water heater comprising:
a tank;
an inlet pipe configured to allow supply of water to the tank;
a water collection channel disposed proximate a base of the tank, the water collection channel configured to collect water leaked from the tank; and
a leakage mitigation system configured to shut-off the supply of water to the tank based on a volume of water leaked from the tank, the leakage mitigation system comprising:
a leakage detection device disposed proximate the base of the tank and coupled to the water collection channel to receive the water leaked from the tank, the leakage detection device comprising a canister configured to: (i) contain a first reactant and a second reactant and, (ii) based on a volume of liquid leaked from the tank, allow the first reactant and the second reactant to react with each other to produce a gas;
a shut-off valve coupled to the inlet pipe of the tank, the shut-off valve configured to allow flow of liquid through the inlet pipe in an open condition and restrict flow of liquid through the inlet pipe in a closed condition; and
a conduit extending between the leakage detection device and the shut-off valve, the conduit configured to allow flow of the gas from the leak detection device to the shut-off valve,
wherein the shut-off valve is configured to actuate between the open condition and the closed condition based on pressure exerted thereon by the flow of the gas.

19. The water heater of claim 18, wherein a first reactant is sodium bicarbonate.

20. The water heater of claim 18, wherein a second reactant is acetic acid.

* * * * *